Patented Oct. 15, 1946

2,409,494

UNITED STATES PATENT OFFICE 2,409,494

CATALYST MANUFACTURE

George H. Keating, Port Arthur, Tex., assignor to The Texas Company, New York, N. Y., a corporation of Delaware No Drawing. Application February 11, 1944, Serial No. 521,974

6 Claims. (Cl. 252—259.2)

The present invention relates to the preparation of inorganic gel catalysts in the form of shaped pieces. The invention is particularly concerned with a process for the preparation of ring-shaped catalyst pieces containing silica gel and other oxides such as alumina, zirconia and the like.

In many fields, particularly in the field of catalytic reactions resulting in the conversion of hydrocarbons to hydrocarbons of increased value as motor fuel, such as catalytic cracking, reforming, isomerization, polymerization and the like, catalysts have been employed in fixed beds. In an operation in which a catalyst is disposed in a fixed bed the catalyst is ordinarily employed in the form of pellets, pieces or the like.

During conversion reactions such as catalytic cracking the catalyst becomes contaminated with coke-like material and, in order that the catalyst may be used for additional conversion, it is necessary that the catalyst be regenerated. For example, in the catalytic cracking of petroleum oils ordinarily the oil to be cracked is heated and vaporized, and the hot vapors are brought into contact with a solid catalyst under controlled conditions of temperature and pressure; for example, at a temperature of 700 to 1100° F. and at atmospheric pressure or a pressure of 100 pounds per square inch or higher. Reaction products, including gas, gasoline hydrocabons and higher boiling hydrocarbons are separated in conventional ways. When regeneration is necessary, this may be accomplished by burning off the carbon or coke with a stream of an oxygen-containing gas. The regenerated catalyst may be used in cracking additional quantities of oil. Thus, a useful catalyst must be capable of being repeatedly regenerated.

An important class of catalysts is prepared from in organic gels (i. e., true gels in the technical sense or gelatinous precipitates). Particularly valuable members of this class are the catalysts prepared to contain a substantial proportion of silica and/or aluminua gels, especially combinations of the two. Combination silica-alumina gel catalysts may be prepared by co-precipitating hydrated silica and alumina gels and drying the resulting mixed gel, by separately precipitating the silica gel and the alumina gel and then mixing the precipitates in wet condition, or by first preparing one of the gels and precipitating the other gel in the presence thereof. Catalysts of this class are more fully disclosed in U. S. Patent No. 2,229,353 to C. L. Thomas et al.

Other metallic oxides may be included in the silica-alumina catalysts. For example, valuable catalysts of this class which contain zirconia are disclosed in British Patent 534,121.

In fixed bed catalytic cracking, the catalysts have generally been employed in the form of small granules or small cylindrical pellets about ⅛ inch by ⅛ inch in size. When using such granules or pellets it has been found that the pressure drop through a body of the catalyst is so large that the catalyst cannot be used in deep beds. This is because a high pressure drop during the catalytic reaction is undesirable and because the blowers which are available for passing flue gas through the catalyst on the regeneration cycle are capable of creating only a limited differential pressure. As a result, it has been necessary in some operations to use a plurality of catalyst beds in a reactor and to pass the hydrocarbon vapors to be cracked through the beds in parallel. In such a system, temperature control is extremely difficult and overheating in certain of the beds causes rapid catalyst deactivation.

To solve this problem it has been proposed to employ the catalyst in a form which, because of the smaller pressure drop would permit the use of a single deep catalyst bed or a lesser numer of catalyst beds. In my application, Serial No. 521,975, filed of even date herewith, a process of preparing inorganic gel catalysts in ring form is disclosed. The process comprises mixing with an inorganic catalyst gel a finely-divided, water-wettable organic material in an amount corresponding to at least 20 per cent, preferably 30 to 60 per cent by weight of the dry catalyst gel to form a plastic extrudable mixture, extruding the mixture, drying and calcining at elevated temperatures. The organic material employed in connection with that process is preferably a starch such as corn starch or wheat flour. The catalysts prepared by that process are initially active and capable of repeated regeneration.

When extruding catalyst gels to form ring-shaped pieces, the gel is extruded as a tube which is broken up or cut into cylindrical pieces of desired length. Since the plastic mixture which is extruded contains a substantial proportion of water, including free water and water of hydration, when drying the rings, there is a large amount of shrinkage. In some cases, the size of the catalyst pieces after drying may be only about one eighth the size of the pieces before drying. This shrinkage causes stress in the walls of the catalyst pieces, and when accomplished by ordinary drying in an oven, results in breakage of the rings.

The present invention is concerned with an improvement in the manufacture of inorganic catalysts in the form of shaped pieces such as rings which has to do with the method of drying these rings.

I have discovered in accordance with the invention that inorganic gel catalysts which have been prepared in the form of rings by extruding a moist, plastic catalyst mixture in substantially tubular form can be dried while avoiding substantial breakage by subjecting the rings to an elevated temperature in an atmosphere maintained at at least 20 per cent relative humidity, preferably at about 25 to 50 per cent relative humidity. Relative humidity, when expressed in percentages, is defined by the expression "100 $p/p_s$" in which $p$ is the partial pressure of water vapor in the air-water mixture under discussion and $p_s$ is the partial pressure of water vapor in saturated air at the temperature in question. It has been found that the absolute humidity or water content of the air is not critical since various temperatures may be employed during the drying. For example, while unsatisfactory results are obtained at a given elevated temperature at which the relative humidity is below 20 per cent, by lowering the temperature to one at which the relative humidity is above this point, effective drying without substantial breakage is accomplished. For practical reasons, temperatures within the range of 150 to 300° F. should generally be employed, and it is preferred to employ temperatures within the range of about 170 to 250° F. The process of the invention is particularly applicable to the catalyst mixtures prepared as described in my application referred to above.

The process is also applicable to inorganic gel catalysts which are extruded in other forms which are subjected to stresses that cause breakage when dried under normal, low humidity conditions. For example, various shapes have been proposed in the art and where breakage upon drying is a problem, the present process may be employed. Also, while it is believed that the use of an organic material as described is important to obtain easily regenerated catalysts, inorganic gel catalysts which have been extruded without such material may be dried effectively as described herein.

As previously indicated, a ring catalyst prepared in accordance with the invention may be in the form of sections of tubes or they may be in the form of tube sections containing cross braces. Cross braces reduce the free space which is present in a catalyst bed and add to the structural strength of the rings.

In order that the invention may be understood more fully, the following example is given:

*Example I*

45 pounds of commercial sodium silicate (containing about 28.5 per cent $SiO_2$ and 8 per cent $Na_2O$) are dissolved in about 45 gallons of water. A dilute solution of hydrochloric acid is added to the resulting solution until the solution is faintly acid to phenolphthalein. As a result of this treatment, a silica gel is formed which is broken down by stirring. Then while agitating, additional hydrochloric acid is added until the solution is acid to Congo red. Thereafter, dilute ammonium hydroxide is added to the solution until neutral to litmus. The neutral product is filtered and washed with water, an aqueous solution of aluminum chloride, and again with water. The washed silica gel is then mixed into a solution containing about 8 pounds of aluminum chloride ($AlCl_3.6H_2O$) in 45 gallons of water. A 1 to 1 solution of concentrated ammonium hydroxide and water is added to the mixture until barely alkaline to litmus and then the pH is adjusted until slightly acid to litmus by adding hydrochloric acid. The slurry is then filtered and the filter cake obtained is washed with water until free from sodium, as shown by the uranyl acetate test applied to the filtrate.

The resulting filter cake comprising hydrated alumina and silica gels in combination is then placed in a muller and a quantity of corn starch or wheat flour corresponding to 20 to 60 per cent by weight of the dry catalyst gel is added, and the mass is mulled until a semi-plastic, substantially homogeneous mixture is obtained. This mixture is then placed in a continuous extruder and is extruded into the desired shapes such as simple rings or rings having cross braces. While extruding, the extruded strings are broken into the desired lengths to form the catalyst particles.

The ring-shaped particles are then collected and placed in an oven having means for maintaining a controlled humidity. The oven is maintained at a temperature of about 200° F. and at a relative humidity of above 20 per cent and preferably about 30 per cent. The rings are retained in the oven until dry to the touch. Inasmuch as the specific water content of the plastic mixture subjected to extrusion is not capable of exact control, the time necessary to accomplish effective drying will vary. In a series of tests, it has been found that at a temperature of 190° F. and a relative humidity of 30 per cent, different batches of rings were dried in from 8 to 12 hours. After drying, the rings are calcined at a temperature of about 1500° F. in the presence of an oxygen-containing gas for about 16 hours. After calcining, the rings are about ⅜ inch in length by ⅜ inch in diameter, and have a wall thickness of about 1/32 inch.

In the following table are given the results obtained in a series of tests of cross-braced rings prepared as described and of the size indicated above, the thickness of the braces being about the same as the wall thickness. These catalyst rings were prepared using ordinary wheat flour in the percentages of the dry weight of the catalyst gel indicated in the table.

| Test No. | Relative humidity, per cent | Temperature, ° F. | Per cent flour used | Per cent whole rings |
| --- | --- | --- | --- | --- |
| 1 | 5.5 | 251 | 40 | 6.8 |
| 2 | 7.4 | 211 | 40 | 7.7 |
| 3 | 6 | 248 | 60 | 26.8 |
| 4 | 5.5 | 251 | 20 | 28.4 |
| 5 | 9 | 230 | 20 | 48.9 |
| 6 | 9 | 230 | 40 | 50.0 |
| 7 | 12 | 190 | 20 | 51.8 |
| 8 | 12 | 190 | 40 | 65.6 |
| 9 | 20.5 | 249 | 20 | 93.1 |
| 10 | 20.5 | 249 | 60 | 94.2 |
| 11 | 24 | 250 | 20 | 96.6 |
| 12 | 27 | 230 | 20 | 91.4 |
| 13 | 27 | 230 | 40 | 97.0 |
| 14 | 28 | 190 | 40 | 98.0 |
| 15 | 28 | 191 | 60 | 98.9 |
| 16 | 36 | 211 | 40 | 97.0 |
| 17 | 36 | 211 | 60 | 98.5 |
| 18 | 45.5 | 170 | 40 | 97.6 |
| 19 | 50 | 190 | 20 | 95.9 |
| 20 | 50 | 190 | 40 | 97.2 |

The data set out in the table show the importance of controlling the humidity during drying. Since minimum breakage occurs at this humidity, and the time required for drying is less than at higher humidities, it is preferred to dry at about 30 per cent relative humidity.

It will be understood that the foregoing example is merely illustrative of the invention and that the invention may be carried into effect in other ways. Thus, other inorganic gel catalysts, that is, catalysts which are predominantly inorganic gels, may be substituted for the catalysts treated in the example, since the physical characteristics of the catalysts, rather than the specific chemical constituents are believed to be determinative of whether the catalysts may be prepared by the present process. The more important silica gel catalysts also contain alumina and may contain another catalytic material, as previously indicated. In such catalysts, the silica preferably constatutes a major proportion of the catalysts, and in the more valuable catalysts, the silica constitutes at least 70 per cent and may constitute up to 99 per cent by weight of the catalyst mixture, although 94 per cent is the preferred upper limit.

As other substances which may be used in silica gel catalysts in place of or in addition to the alumina and/or the zirconia, there may be mentioned a wide variety of metallic oxides which have been disclosed in the literature on the subject, including the oxides of metals from groups II to VIII of the periodic table, the particular oxide or oxides selected being dependent upon the reaction in which the catalyst is to be used.

In connection with the silica-alumina catalysts with or without another metal oxide, it may be of advantage to point out that these catalysts are colloidal or amorphous combinations of silica and alumina, although there is some evidence that a part at least of the alumina may be crystalline. In treating these catalysts as well as other inorganic gel catalysts, it is desirable that the gels be in the hydrated state at the time of extrusion.

Another important class of silica gel catalysts are catalysts which contain a major proportion of silica and an active hydrated metallic fluoride which is stable and nonvolatile up to temperatures of about 1200° F. As metallic fluorides for use in such catalysts there may be mentioned the fluorides of aluminum, chromium, magnesium, barium, calcium, cerium, copper, iron, manganese, nickel, strontium, uranium, and bismuth. The fluorides of aluminum and magnesium are of special interest. Important catalysts of this class contain silica, hydrated aluminum fluoride, magnesium fluoride or magnesia, and a small proportion of alumina. For the purposes of this invention, these catalysts may be regarded as a special type of silica-alumina catalyst.

When incorporating an organic material such as a starch in a catalyst gel, the material may be introduced in the form of a cooked slurry rather than in dry form as described in the example.

Obviously many modifications and variations of the invention, as hereinbefore set forth, may be made without departing from the spirit and scope thereof, and therefore only such limitations should be imposed as are indicated in the appended claims.

I claim:

1. A process for the production of a catalyst comprising at least a major proportion of an inorganic gel prepared by precipitation in aqueous solution which comprises mixing the inorganic catalyst gel while in moist and hydrated state with a starch material in an amount corresponding to between about 30 to 60 per cent of the dry weight of the catalyst gel to form a plastic mass, extruding the plastic mass in substantially tubular form, dividing the extruded catalyst into rings, drying resulting rings at an elevated temperature in the range of about 150 to 300° F. in an atmosphere maintained at about 20 to 50 per cent relative humidity and calcining resulting dried rings.

2. A process for the production of a catalyst comprising at least a major proportion of an inorganic gel prepared by precipitation in aqueous solution which comprises mixing the inorganic catalyst gel while in moist and hydrated state with a starch material in an amount corresponding to between about 30 to 60 per cent of the dry weight of the catalyst gel to form a plastic mass, extruding the plastic mass in substantially tubular form, dividing the extruded catalyst into rings, drying resulting rings at an elevated temperature in the range of about 170 to 250° F. in an atmosphere maintained at about 20 to 30 per cent relative humidity and calcining resulting dried rings.

3. The process according to claim 1 in which the starch material comprises corn starch.

4. The process according to claim 1 in which the starch material comprises wheat flour.

5. A process for the production of catalyst which comprises mixing a combination comprising a major proportion of silica gel and a minor proportion of hydrated alumina gel, said combination being prepared by precipitation in aqueous solution, while in the moist and hydrated state with a starch material in an amount corresponding to between about 30 to 60 per cent of the dry weight of the catalyst gel to form a plastic mass, extruding the plastic mass in substantially tubular form, dividing resulting extruded catalyst into rings, drying resulting rings at an elevated temperature in the range of about 150 to 300° F. in an atmosphere maintained at about 20 to 50 per cent relative humidity and calcining resulting dried rings.

6. A process for the production of catalyst which comprises mixing a combination comprising a major proportion of silica gel and a minor proportion of hydrated alumina gel, said combination being prepared by precipitation in aqueous solution, while in the moist and hydrated state with a dry starch material in an amount corresponding to between about 30 to 60 per cent of the dry weight of the catalyst gel to form a plastic mass, extruding the plastic mass in substantially tubular form, dividing resulting extruded catalyst into rings, drying resulting rings at an elevated temperature in the range of about 150 to 300° F. in an atmosphere maintained at about 20 to 50 per cent relative humidity and calcining resulting dried rings.

GEORGE H. KEATING.